(12) United States Patent
Matsuo

(10) Patent No.: US 11,840,181 B2
(45) Date of Patent: Dec. 12, 2023

(54) IN-VEHICLE COMMUNICATION DEVICE AND METHOD FOR STARTING UP IN-VEHICLE DEVICE

(71) Applicant: Sumitomo Wiring Systems, Ltd., Yokkaichi (JP)

(72) Inventor: Tomoki Matsuo, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 447 days.

(21) Appl. No.: 16/973,121

(22) PCT Filed: May 27, 2019

(86) PCT No.: PCT/JP2019/020911
§ 371 (c)(1),
(2) Date: Dec. 8, 2020

(87) PCT Pub. No.: WO2019/235285
PCT Pub. Date: Dec. 12, 2019

(65) Prior Publication Data
US 2021/0253045 A1 Aug. 19, 2021

(30) Foreign Application Priority Data
Jun. 8, 2018 (JP) .................................. 2018-110550

(51) Int. Cl.
*B60R 16/02* (2006.01)
*B60R 16/023* (2006.01)
*B60R 16/027* (2006.01)

(52) U.S. Cl.
CPC ........ *B60R 16/0231* (2013.01); *B60R 16/027* (2013.01)

(58) Field of Classification Search
CPC . B60R 16/0231; B60R 16/027; B60R 16/023; G06F 9/4405
See application file for complete search history.

(56) References Cited

U.S. PATENT DOCUMENTS 10,742,740 B2 * 8/2020 Kakiya ............. H04L 12/40136
2005/0228562 A1 * 10/2005 Sayama .................. G06F 1/10
307/43

(Continued)

FOREIGN PATENT DOCUMENTS

| JP | 2008-287317 A | 11/2008 |
| JP | 2009-258986 A | 11/2009 |
| JP | 2015-053633 A | 3/2015 |

OTHER PUBLICATIONS

International Search Report, Application No. PCT/JP2019/020911, dated Jun. 25, 2019. ISA/Japan Patent Office.

*Primary Examiner* — Behrang Badii
(74) *Attorney, Agent, or Firm* — Honigman LLP

(57) ABSTRACT

An in-vehicle communication device and a method for starting up an in-vehicle device are provided. An in-vehicle communication device according to the present embodiment includes: a first processing unit; a second processing unit; and a communication unit. The first processing unit, upon being started up, performs initialization processing thereof. The second processing unit requires a shorter time from start-up until completion of the initialization processing than the first processing unit does. Another in-vehicle device is connected to the communication unit via a communication line, and the communication unit communicates with the other in-vehicle device in accordance with control of the first processing unit and the second processing unit. The second processing unit, after completing the initialization processing thereof, transmits an instruction to start up the other in-vehicle device via the communication unit.

6 Claims, 6 Drawing Sheets

(56) References Cited

U.S. PATENT DOCUMENTS

| | | | |
|---|---|---|---|
| 2008/0077786 A1* | 3/2008 | Pierce | G06F 9/4405 |
| | | | 713/2 |
| 2018/0056898 A1* | 3/2018 | Kanamori | B60R 1/00 |
| 2019/0250611 A1* | 8/2019 | Costin | G05D 1/0257 |

* cited by examiner

IN-VEHICLE COMMUNICATION DEVICE AND METHOD FOR STARTING UP IN-VEHICLE DEVICE

CROSS-REFERENCE TO RELATED APPLICATIONS

This application is the U.S. national stage of PCT/JP2019/020911 filed on May 27, 2019, which claims priority of Japanese Patent Application No. JP 2018-110550 filed on Jun. 8, 2018, the contents of which are incorporated herein.

TECHNICAL FIELD

The present disclosure relates to an in-vehicle communication device and a method for starting up an in-vehicle device mounted in a vehicle.

BACKGROUND

Conventionally, a plurality of devices mounted in a vehicle, such as ECUs (Electronic Control Units) and a gateway, are connected to each other via a vehicle network, such as a CAN (Controller Area Network) or Ethernet (registered trademark), exchange information through communication with other devices, and cooperate to control the vehicle, for example.

JP 2015-053633A proposes a circuit configuration that can be expected to reduce the influence of ringing in a communication system that includes a main line having a pair of communication lines, a first communication device having a terminator interposed in the main line, a branch line branching from the main line, and a second communication device connected to the branch line.

In recent years, with the advance of the functionality of vehicles, various devices mounted in the vehicles also have higher functionality. Higher functionality of devices accompanies an increase in the size of processors and an increase in the memory capacity, as well as further complexity of programs, for example. In these devices, initialization processing is performed after start-up, but the higher the functionality of the devices is, the longer the time from the start-up until completion of the initialization processing is. In particular, in a system with a configuration in which a plurality of devices mounted in a vehicle are sequentially started up, the time until completion of the initialization processing in each of the devices accumulates, and thus the time required from the start-up until completion of the initialization processing significantly increases in the system as a whole.

The present disclosure has been made in view of the foregoing situation, and aims to provide an in-vehicle communication device and a method for starting up an in-vehicle device that can be expected to reduce the time from start-up until completion of the initialization processing in a system as a whole.

SUMMARY

An in-vehicle communication device according to the present mode includes: a first processing unit; a second processing unit; and a communication unit, wherein the first processing unit, upon being started up, performs initialization processing thereof, the second processing unit requires a shorter time from start-up until completion of the initialization processing than the first processing unit does, another in-vehicle device is connected to the communication unit via a communication line, and the communication unit communicates with the other in-vehicle device in accordance with control of the first processing unit and the second processing unit, and the second processing unit, after completing the initialization processing thereof, transmits an instruction to start up the other in-vehicle device via the communication unit.

A method for starting up an in-vehicle device according to the present mode is a method for starting up an in-vehicle device in which an in-vehicle communication device, to which another in-vehicle device is connected via a communication line and which includes a communication unit for communicating with the other in-vehicle device, starts up the other in-vehicle device, the in-vehicle communication device including: a first processing unit for performing initialization processing thereof upon being started up; and a second processing unit that requires a shorter time from start-up until completion of the initialization processing than the first processing unit does, the method including: transmitting an instruction to start up the other in-vehicle device via the communication unit after completing the initialization processing, by the second processing unit.

Note that the present application can be not only realized as an in-vehicle communication device that includes the above-described characteristic processing unit, but can also be realized as a method for starting up an in-vehicle device that includes the above-described characteristic processing as steps, and can also be realized as a computer program for causing a computer to perform these steps. Furthermore, the present application can also be realized as a semiconductor integrated circuit that realizes a part of or the entire in-vehicle communication device, and can also be realized as another device or a system that includes the in-vehicle communication device.

Advantageous Effects of Invention

According to the above, it can be expected that the time from start-up until completion of the initialization processing is shortened in a system as a whole.

DETAILED DESCRIPTION OF PREFERRED EMBODIMENTS

Figure 1:
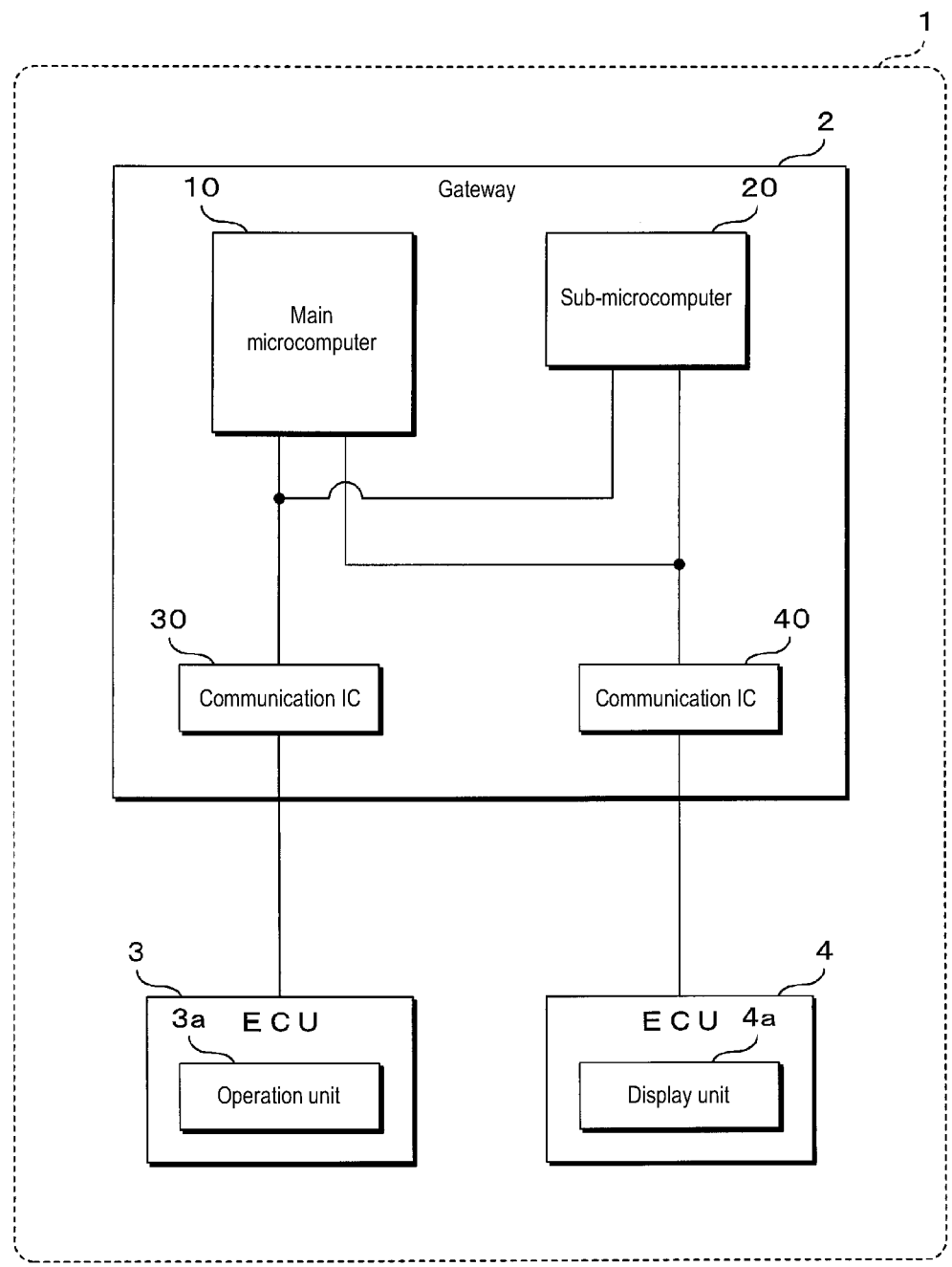
FIG. 1 is a block diagram showing a configuration of a communication system according to the present embodiment.

First, modes for carrying out of the present disclosure will be listed and described. At least some of the following embodiments may also be combined in any manner.

An in-vehicle communication device according to the present mode includes: a first processing unit; a second processing unit; and a communication unit, wherein the first processing unit, upon being started up, performs initialization processing thereof, the second processing unit requires a shorter time from start-up until completion of the initialization processing than the first processing unit does, another in-vehicle device is connected to the communication unit via a communication line, and the communication unit communicates with the other in-vehicle device in accordance with control of the first processing unit and the second processing unit, and the second processing unit, after completing the initialization processing thereof, transmits an instruction to start up the other in-vehicle device via the communication unit.

In this mode, the in-vehicle communication device includes two processing units, namely the first processing unit and the second processing unit. The first processing unit and the second processing unit start the initialization processing after being started up, and can perform processing such as communication after completing the initialization processing. Here, the second processing unit requires a shorter time from the start-up until completion of the initialization processing than the first processing unit. The second processing unit, after completing the initialization processing thereof, transmits the start-up instruction to the other in-vehicle device even if the initialization processing of the first processing unit has not been completed. With this configuration, the start-up instruction can be transmitted to the other in-vehicle device without waiting for completion of the initialization processing of the first processing unit, and the other in-vehicle device can start and complete initialization processing at an earlier timing. Accordingly, the time required from the start-up until completion of the initialization processing can be shortened in the system as a whole.

It is preferable that the first processing unit and the second processing unit both start the initialization processing if a start-up instruction based on acceptance of an operation is given thereto.

In the present mode, the start-up instruction is given to the first processing unit and the second processing unit based on a user operation having been accepted, and both the first processing unit and the second processing unit start the initialization processing in accordance with the start-up instruction. Due to the second processing unit being started up and starting the initialization processing without a delay from the start-up of the first processing unit, the second processing unit, which requires a shorter time to perform the initialization processing, can reliably complete the initialization processing earlier than the first processing unit, and can transmit the start-up instruction to the other in-vehicle device.

It is preferable that the second processing unit stops processing after transmitting the instruction to start up the other in-vehicle device.

In the present mode, the second processing unit stops processing after transmitting the start-up instruction to the other in-vehicle device. Note that if the second processing units needs to transmit the start-up instruction to a plurality of in-vehicle devices, the second processing may stop processing after transmitting the start-up instruction to all of the plurality of in-vehicle devices. Power consumption by the second processing unit can be reduced by stopping processing. In addition, due to the second processing unit not performing processing other than transmission of the start-up instruction, the scale of hardware and software of the second processing unit can be reduced, and the initialization processing of the second processing unit can be completed in a shorter time.

It is preferable that if the initialization processing of the first processing unit has failed, the second processing unit transmits an instruction to stop operation to the other in-vehicle device via the communication unit.

According to the present mode, the second processing unit that has finished the initialization processing earlier determines whether or not the initialization processing of the first processing unit has been successful or failed. If the initialization processing of the first processing unit has failed, the second processing unit transmits an instruction to stop operation to the other in-vehicle device to which the second processing unit has transmitted the start-up instruction. Thus, it is possible to prevent the other in-vehicle device that has been started up before the first processing unit completes the initialization processing from continuing to operate although the initialization processing of the first processing unit has failed.

A method for starting up an in-vehicle device according to the present mode is a method for starting up an in-vehicle device in which an in-vehicle communication device, to which another in-vehicle device is connected via a communication line and which includes a communication unit for communicating with the other in-vehicle device, starts up the other in-vehicle device, the in-vehicle communication device including: a first processing unit for performing initialization processing thereof upon being started up; and a second processing unit that requires a shorter time from start-up until completion of the initialization processing than the first processing unit does, the method including: transmitting an instruction to start up the other in-vehicle device via the communication unit after completing the initialization processing, by the second processing unit.

According to the present mode, similar to the mode (1), the time required from start-up until completion of the initialization processing can be shortened in the system as a whole.

Specific examples of the in-vehicle communication device according to the embodiments of the present disclosure will be described below with reference to the drawings. Note that the present disclosure is not limited to these examples but defined by the claims, and is intended to encompass all changes made within the meaning and scope equivalent to the claims.

FIG. 1 is a block diagram showing a configuration of a communication system according to the present embodiment. A communication system according to the present embodiment has a configuration in which ECUs ("another in-vehicle device") 3 and 4 are connected, via communication lines, to a gateway ("in-vehicle communication device") 2 that is mounted in a vehicle 1. However, the number of ECUs mounted in the vehicle 1, the number of communication lines, the number of ECUs connected to each communication line, and so on, are merely an example, and the present invention is not limited thereto.

In the present embodiment, the ECU 3 includes an operation unit 3a for accepting a user operation. The operation unit 3a accepts a user operation using an input device such as a switch, a lever, or a touch panel, for example. The ECU 4 includes a display unit 4a for displaying various images. The display unit 4a is constituted by a liquid-crystal display, for example. In the communication system according to the present embodiment, the ECU 3 accepts a user operation with the operation unit 3a and transmits, to the gateway 2, a message that includes operation information, the gateway 2 transmits the message received from the ECU 3 to the ECU 4, and the ECU 4 that has received this message displays an image corresponding to the operation information on the display unit 4a. This communication system can be applied to a system that displays information on the display unit 4a provided at the periphery of a driver's seat of the vehicle 1 when, for example, a user performs an operation to turn on an ignition switch of the vehicle 1.

The gateway 2 performs processing to relay the message transmitted and received between the ECU 3 and the ECU 4. The gateway 2 according to the present embodiment includes a main microcomputer (microcontroller) 10, a sub-microcomputer 20, communication ICs (Integrated Circuits) 30 and 40, and so on. The microcontroller includes, for example, a processor, a memory, a communication unit, and so on that are configured as one IC, and can perform various kinds of computing processing, control processing, and so on by executing a program that is stored in advance. The gateway 2 according to the present embodiment includes two microcomputers, namely the main microcomputer (first processing unit) 10 and the sub-microcomputer (second processing unit) 20.

The communication ICs (communication units) 30 and 40 are ICs for converting a digital signal used in the circuit of the gateway 2 to a signal to be transmitted and received via a communication unit, and vice versa. The communication ICs 30 and 40 convert a transmitted message that is given as a digital signal from the main microcomputer 10 and the sub-microcomputer 20 to an electrical signal, and outputs this electrical signal to a communication line. Also, the communication ICs 30 and 40 sample and acquire an electrical signal on a communication line, and give a received message acquired as a digital signal to the main microcomputer 10 and the sub-microcomputer 20. Both the main microcomputer 10 and the sub-microcomputer 20 are connected to the communication ICs 30 and 40, and can communicate with the ECUs 3 and 4 via the communication ICs 30 and 40.

The two microcontrollers included in the gateway 2 according to the present embodiment are not identical to each other, but have different configurations. For example, the memory capacity of the main microcomputer 10 is greater than the memory capacity of the sub-microcomputer 20. However, performance, such as processing speed, of the processors in these microcomputers may be the same. A program executed by the main microcomputer 10 has a large program size and high functionality and is multifunctional, compared with a program executed by the sub-microcomputer 20.

For example, when the ignition switch of the vehicle 1 is in an off state, the gateway 2 and the ECUs 3 and 4 mounted in the vehicle 1 are in a state of not performing processing, such as a power-off state or a standby state. Thereafter, the gateway 2 and the ECUs 3 and 4 are started up and start processing at a timing at which the ignition switch is turned on, for example. In the present embodiment, the ECU 3 is started up when a user operation is made to the operation unit 3a, the gateway 2 is started up due to the ECU 3 that has completed initialization processing communicating with the gateway 2, and further, the ECU 4 is started up due to the gateway 2 communicating with the ECU 4. That is to say, in this communication system, the ECU 3, the gateway 2, and the ECU 4 are started in that order.

The microcomputers that have been started up from a non-operating state start hardware resources that they have, verify operations thereof, initialize a temporary memory such as a register, read out a program and data from the memory, or perform setting processing related to communication security or the like as initialization processing. In the present embodiment, the sub-microcomputer 20, which has a smaller memory capacity and a smaller program size, requires a shorter time from start-up until completion of the initialization processing, and the main microcomputer 10, which has a larger memory capacity and a larger program size, requires a longer time from start-up until completion of the initialization processing.

In the gateway 2 according to the present embodiment, the sub-microcomputer 20, which completes the initialization processing earlier, communicates with the ECU 4 after finishing the processing and thus starts up the ECU 4. The ECU 4 can start the initialization processing in parallel while the main microcomputer 10 is performing the initialization processing. Thus, the timing at which the ECU 4 completes the initialization processing can be made earlier than in the case where the main microcomputer 10 starts up the ECU 4.

Figure 2:
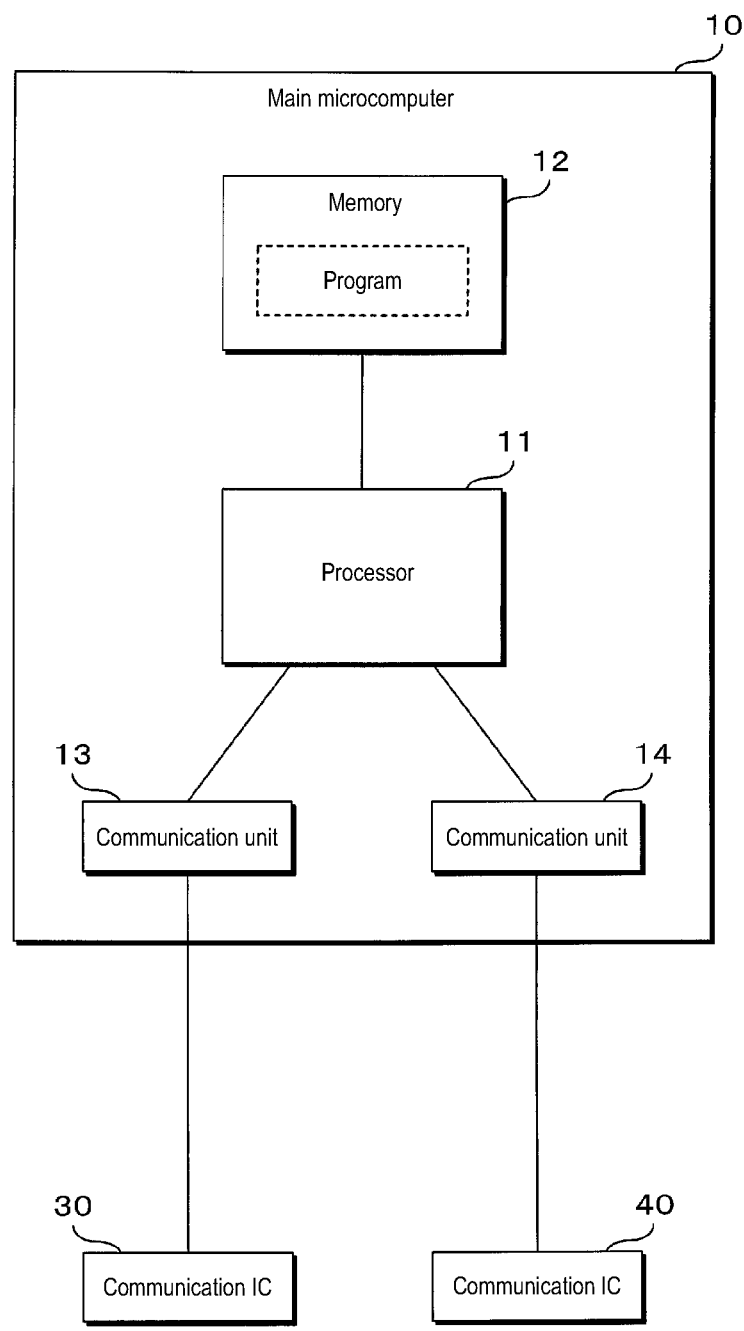
FIG. 2 is a block diagram showing a configuration of a main microcomputer according to the present embodiment.

FIG. 2 is a block diagram showing a configuration of the main microcomputer 10 according to the present embodiment. The main microcomputer of the gateway 2 according to the present embodiment includes a processor 11, a memory 12, communication units 13 and 14, and so on. The processor 11 is a computing device that performs various kinds of computing processing by reading out and executing programs stored in the memory 12. The memory 12 is constituted by a nonvolatile memory element such as an EEPROM (Electrically Erasable Programmable Read Only Memory) or a flash memory, and stores various programs to be executed by the processor 11 and data needed to execute these programs, or the like.

The communication units 13 and 14 transmit and receive messages based on a communication standard, such as a CAN or Ethernet, for example. The communication units 13 and 14 are connected to the communication ICs 30 and 40, respectively, via interconnects on a circuit board of the gateway 2. The communication units 13 and 14 can communicate with the ECUs 3 and 4, respectively, via the communication ICs 30 and 40 via communication lines. The communication units 13 and 14 output, as a digital signal, a message given from the processor 11 to the communication ICs 30 and 40, and thus the message is transmitted from the communication ICs 30 and 40 to the ECUs 3 and 4, respectively. The communication units 13 and 14 also receive a message from the ECUs 3 and 4 by acquiring a digital signal given from the communication ICs 30 and 40, respectively, and give the received message to the processor 11.

Figure 3:
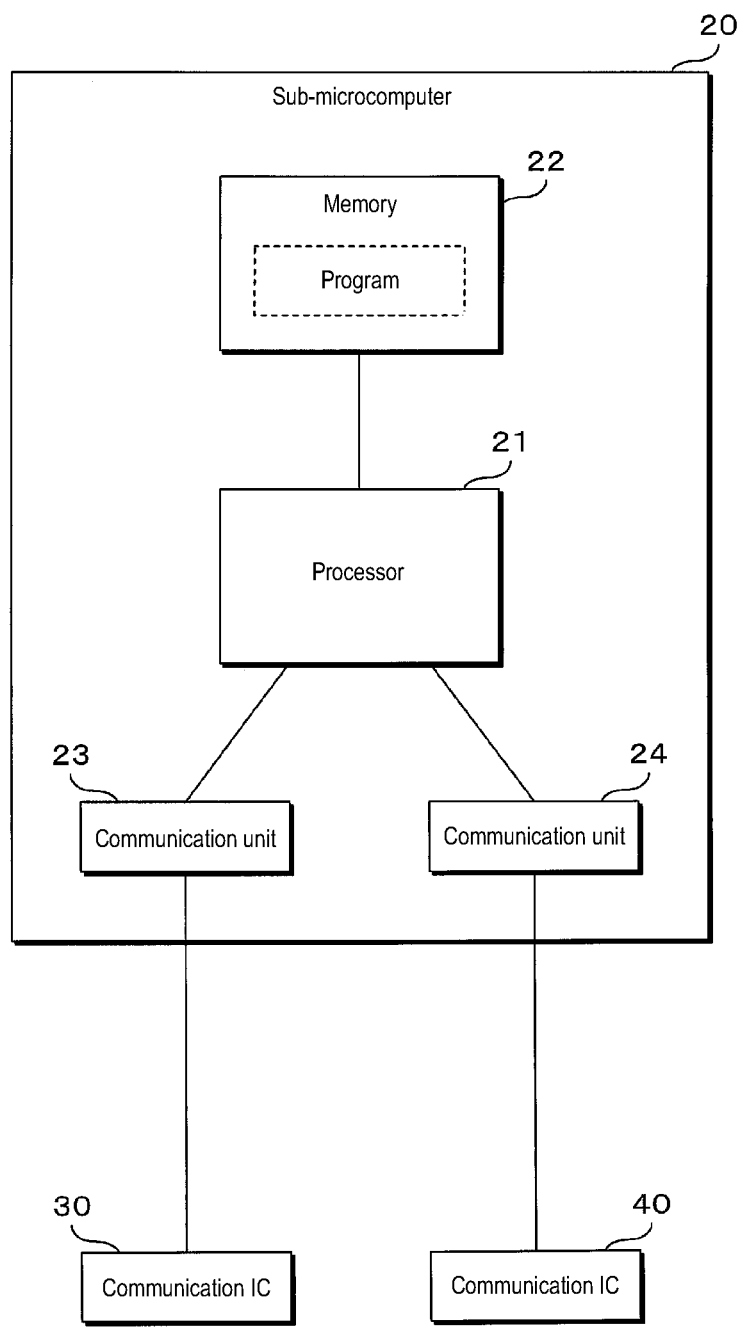
FIG. 3 is a block diagram showing a configuration of a sub-microcomputer according to the present embodiment.

FIG. 3 is a block diagram showing a configuration of the sub-microcomputer 20 according to the present embodiment. The sub-microcomputer of the gateway 2 according to the present embodiment includes a processor 21, a memory 22, communication units 23 and 24, and so on. The processor 21 is a computing device that performs various kinds of computing processing by reading out and executing programs stored in the memory 22. The memory 22 is constituted by a nonvolatile memory element such as an EEPROM or a flash memory, and stores various programs to be executed by the processor 21 and data needed to execute these programs, or the like.

The communication units 23 and 24 transmit and receive messages based on a communication standard, such as a CAN or Ethernet, for example. The communication units 23 and 24 are connected to the communication ICs 30 and 40, respectively, via interconnects on a circuit board of the gateway 2. The communication units 23 and 24 can communicate with the ECUs 3 and 4, respectively, via the communication ICs 30 and 40 via communication lines. The communication units 23 and 24 output, as a digital signal, a message given from the processor 21 to the communication ICs 30 and 40, and thus the message is transmitted from the communication ICs 30 and 40 to the ECUs 3 and 4, respectively. The communication units 23 and 24 also receive a message from the ECUs 3 and 4 by acquiring a digital signal given from the communication ICs 30 and 40, and give the received message to the processor 21.

Figure 4:
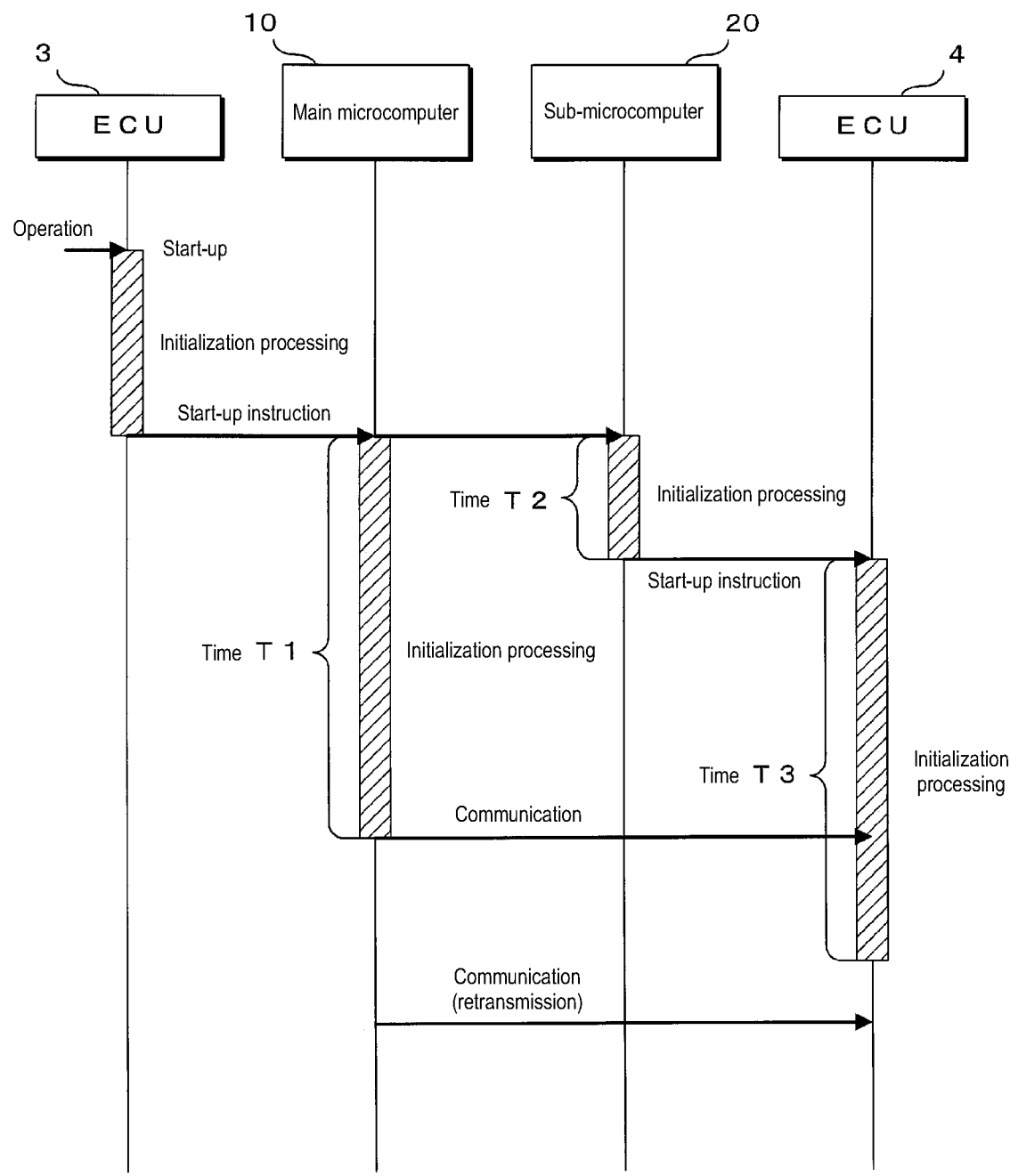
FIG. 4 is a timing chart for illustrating processing performed at the time of start-up by devices in the communication system according to the present embodiment.

FIG. 4 is a timing chart for illustrating processing performed at the time of start-up by the devices in the communication system according to the present embodiment. In an example shown in the diagram, the ECU 3, the gateway 2, and the ECU 4 are started up in that order. For example, the ECU 3 is started up when accepting a user operation made to the operation unit 3a, and starts the initialization processing. After completing the initialization processing, the ECU 3 transmits a start-up instruction to the gateway 2. Note that the start-up instruction transmitted from the ECU 3 to the gateway 2 may be transmission of a message of any kind.

The start-up instruction from the ECU 3 to the gateway 2 is given to both the main microcomputer 10 and the sub-microcomputer 20 of the gateway 2. Both the main microcomputer 10 and the sub-microcomputer 20 are started up in accordance with this start-up instruction, and start the initialization processing. Here, the time required from start-up until completion of the initialization processing by the main microcomputer 10 is longer than the time required from start-up until completion of the initialization processing by the sub-microcomputer 20. That is to say, if the time required for the initialization processing the main microcomputer 10 is denoted as T1, and the time required for the initialization processing of the sub-microcomputer 20 is denoted as T2, a relationship expressed as the time T1>the time T2 holds.

The sub-microcomputer 20 that has finished the initialization processing with the time T2 transmits the start-up instruction to the ECU 4. Note that the start-up instruction transmitted from the sub-microcomputer 20 to the ECU 4 may be transmission of a message of any kind. The ECU 4 is started up as a result of receiving the message from the gateway 2, whatever the message is like, and starts the initialization processing. Here, the time required for the initialization processing of the ECU 4 is denoted as T3. The initialization processing of the ECU 4 may be performed in parallel with the initialization processing of the main microcomputer 10 of the gateway 2.

The main microcomputer 10 that has finished the initialization processing with the time T1 starts normal processing, such as relaying a message, and performs communication processing to transmit a message to the ECU 4, for example. At this time, if the initialization processing of the ECU 4 has not finished, the main microcomputer 10 does not obtain a response message from the ECU 4. In this case, the main microcomputer 10 may retransmit the message after a lapse of a predetermined time, for example.

In the example shown in the diagram, the time from when the ECU 3 gives the start-up instruction to the gateway 2 until when the initialization processing of the ECU 4 finishes is (T2+T3). If the sub-microcomputer 20 is not configured to give the start-up instruction to the ECU 4, the ECU 4 is started up by a message transmitted by the main microcomputer 10 after finishing the initialization processing, and the initialization processing of the ECU 4 is started. In this case, the time from when the ECU 3 gives the start-up instruction to the gateway 2 and the initialization processing of the ECU 4 finishes is (T1+T3), and a relationship expressed as the time (T1+T3)>the time (T2+T3) holds. That is to say, by employing a configuration in which the sub-microcomputer 20 gives the start-up instruction to the ECU 4, the time until completion of the initialization processing can be shortened in the communication system as a whole.

Figure 5:
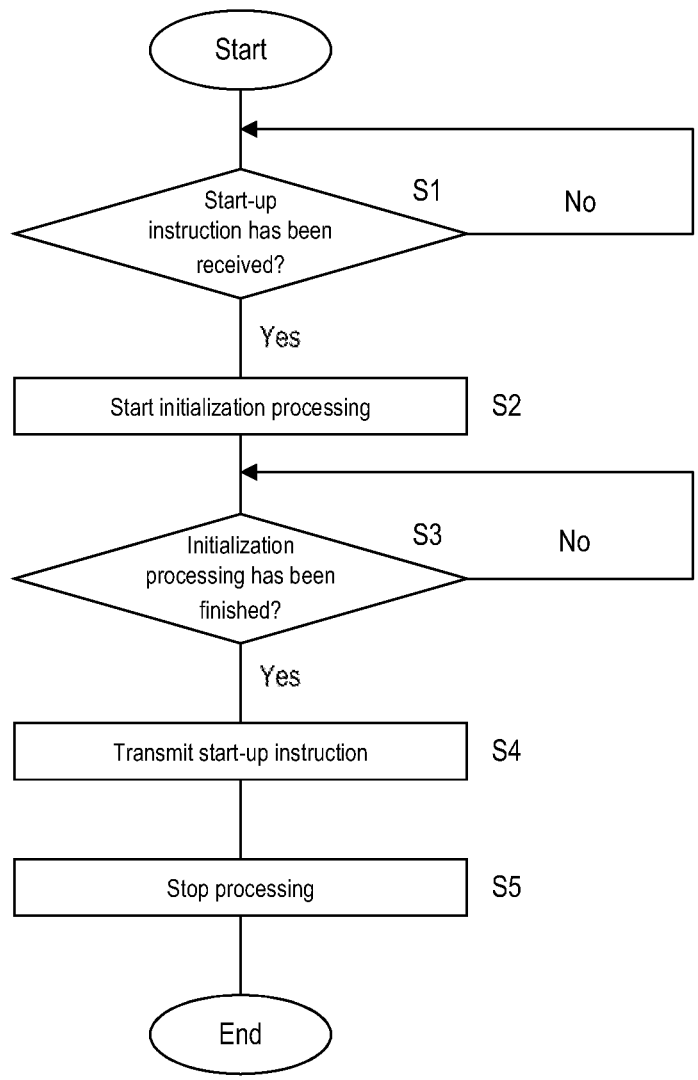
FIG. 5 is a flowchart showing a procedure of processing performed by the sub-microcomputer according to the present embodiment.

FIG. 5 is a flowchart showing a procedure of processing performed by the sub-microcomputer 20 according to the present embodiment. The processor 21 of the sub-microcomputer 20 according to the present embodiment determines whether or not the communication unit 23 has received the start-up instruction from the ECU 3 (step S1). If the communication unit 23 has not received the start-up instruction (S1: NO), the processor 21 waits until receiving the start-up instruction. If the communication unit 23 has received the start-up instruction (S1: YES), the processor 21 starts the initialization processing (step S2).

Thereafter, the processor 21 determines whether or not the initialization processing has finished (step S3). If the initialization processing has not finished (S3: NO), the processor 21 continues to perform the initialization processing. If the initialization processing has finished (S3: YES), the processor 21 transmits the start-up instruction to the ECU 4 via the communication unit 24 (step S4). After finishing transmitting the necessary start-up instruction, the processor 21 stops processing (step S5), and ends the processing.

The gateway 2 with the above configuration according to the present embodiment includes two microcomputers, namely the main microcomputer 10 and the sub-microcomputer 20. The main microcomputer 10 and the sub-microcomputer 20 start the initialization processing after being started up, and can perform processing, such as communication, after finishing the initialization processing. The sub-microcomputer 20 requires a shorter time from start-up until completion of the initialization processing than the main microcomputer 10. After completing the initialization processing, the sub-microcomputer 20 transmits the start-up instruction to the ECU 4 even if the initialization processing of the main microcomputer 10 has not been completed. Thus, the gateway 2 can transmit the start-up instruction to the ECU 4 without waiting for completion of the initialization processing of the main microcomputer 10. The ECU 4 can start the initialization processing at an earlier timing, and can finish the initialization processing at an earlier timing. Accordingly, the time required from the start-up until completion of the initialization processing can be shortened in the system as a whole.

In the communication system according to the present embodiment, the ECU 3, due to accepting a user operation made to the operation unit 3a, gives the start-up instruction to the main microcomputer 10 and the sub-microcomputer 20 of the gateway 2, and both the main microcomputer 10 and the sub-microcomputer 20 start the initialization processing in accordance with the start-up instruction. Due to the sub-microcomputer 20 being started up and starting the initialization processing without delay from start-up of the main microcomputer 10, the sub-microcomputer 20, which requires a shorter time for the initialization processing, can reliably complete the initialization processing earlier than the main microcomputer 10, and can transmit the start-up instruction to the ECU 4.

The sub-microcomputer 20 according to the present embodiment stops processing after transmitting the start-up instruction to the ECU 4. Due to the sub-microcomputer 20 stopping processing, power consumption by the sub-microcomputer 20 can be reduced, and power consumption by the gateway 2 can be reduced. In addition, due to the sub-microcomputer 20 not performing processing other than transmission of the start-up instruction, the scale of hardware and software of the sub-microcomputer 20 can be reduced, and the initialization processing of the sub-microcomputer 20 can be completed in a shorter time.

Although, in the present embodiment, the gateway 2 and the ECUs 3 and 4 are mounted in the vehicle 1, the present invention is not limited thereto, and the present technology can also be applied to communication devices other than in-vehicle vehicles. Although the processing units provided in the gateway 2 are microcomputers, the present invention is not limited thereto, and the processing units may be any of various devices other than microcomputers. Although the communication system that includes the gateway 2 and the ECUs 3 and 4 is started up in accordance with a user operation made to the operation unit 3a, the present invention is not limited thereto, and the communication system may alternatively be configured to be started up due to a factor other than a user operation. The operation unit 3a is not limited to an ignition switch of the vehicle 1, and may alternatively be any of various other switches or levers, or the like. Although the sub-microcomputer 20 is a small-scale microcomputer that has, for example, a memory capacity smaller than that of the main microcomputer 10, the present invention is not limited thereto, and a configuration may alternatively be employed in which the main microcomputer 10 and the sub-microcomputer 20 are microcomputers with the same configuration, and the size of the program executed by the sub-microcomputer 20 is smaller than the program size of the main microcomputer 10. Although the sub-microcomputer 20 is configured to stop processing after transmitting the start-up instruction to the ECU 4, the present invention is not limited thereto, and the sub-microcomputer 20 may also perform other processing after transmitting the start-up instruction.

Modifications

The sub-microcomputer 20 of the gateway 2 according to a modification does not stop processing after completing the initialization processing and transmitting the start-up instruction to the ECU 4, and performs processing to monitor whether or not the initialization processing of the main microcomputer 10 has finished without abnormality. The sub-microcomputer 20 according to the modification monitors, for example, information exchanged between the main microcomputer 10 and the communication ICs 30 and 40, and determines whether or not a message that is to be transmitted to the ECU 4 after the initialization processing of the main microcomputer 10 has been completed, has been normally transmitted. If this message has been normally transmitted, the sub-microcomputer 20 determines that the initialization processing of the main microcomputer 10 has been normally completed. If it is determined that the initialization processing of the main microcomputer 10 has been completed, the sub-microcomputer 20 may end processing.

On the other hand, if, for example, the message is not transmitted from the main microcomputer 10 to the ECU 4 even after the time T1 required for the initialization processing or more has elapsed, the sub-microcomputer 20 determines that the main microcomputer 10 has failed in the initialization processing. If the initialization processing of the main microcomputer 10 has failed, the sub-microcomputer 20 gives an instruction to stop processing to the ECU 4 to which the sub-microcomputer 20 has given the start-up instruction. Thus, the ECU 4 can be prevented from performing processing in a situation where the main microcomputer of the gateway 2 cannot perform processing that is originally to be performed.

Figure 6:
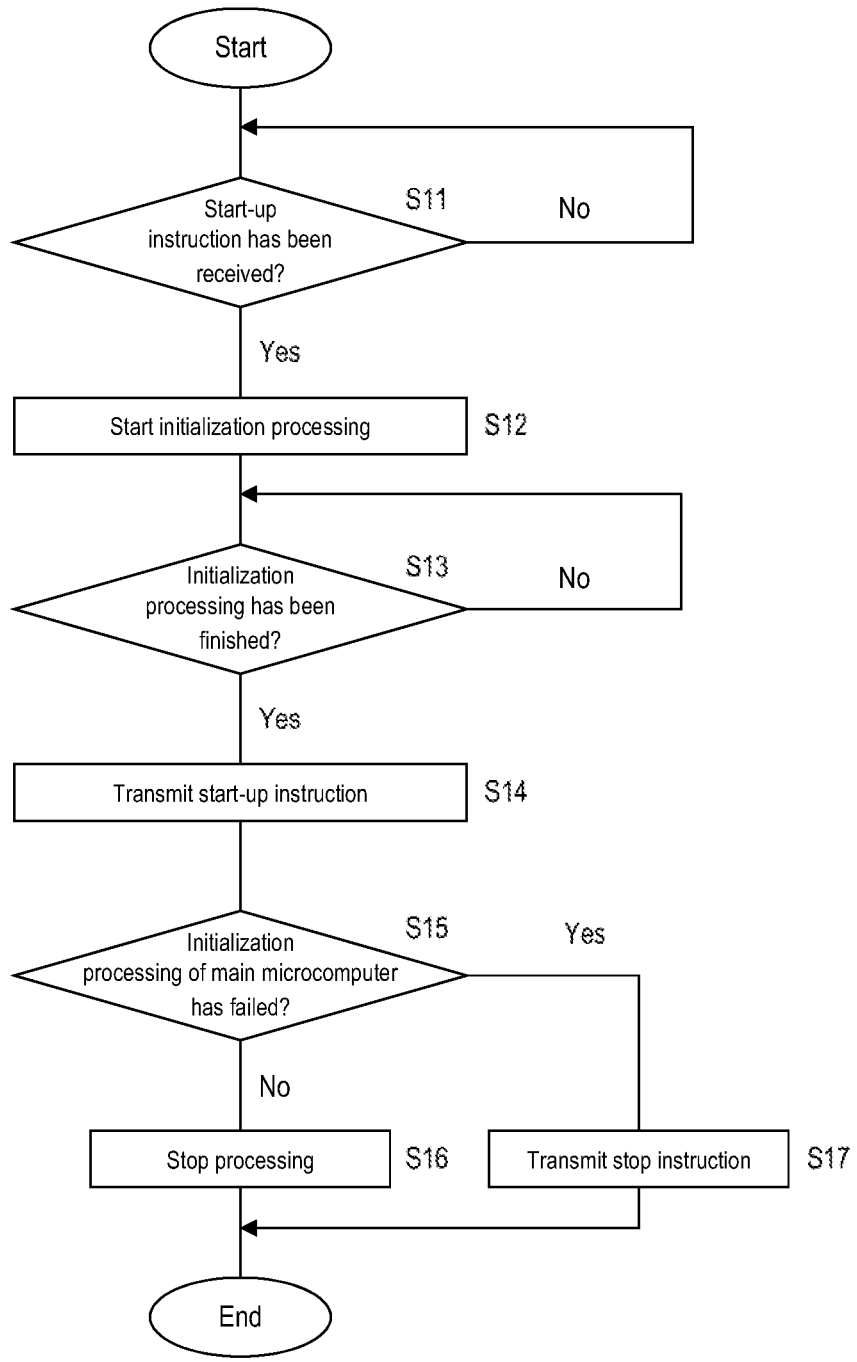
FIG. 6 is a flowchart showing a procedure of processing performed by the sub-microcomputer according to a modification.

FIG. 6 is a flowchart showing a procedure of processing performed by the sub-microcomputer 20 according to the modification. The processor 21 of the sub-microcomputer 20 according to the modification determines whether or not the processor 21 has received the start-up instruction from the ECU 3 via the communication unit 23 (step S11). If the processor 21 has not received the start-up instruction (S11: NO), the processor waits until receiving the start-up instruction. If the processor 21 has received the start-up instruction (S11: YES), the processor 21 starts the initialization processing (step S12).

Thereafter, the processor 21 determines whether or not the initialization processing has finished (step S13). If the initialization processing has not finished (S13: NO), the processor 21 continues to perform the initialization processing. If the initialization processing has finished (S13: YES), the processor 21 transmits the start-up instruction to the ECU 4 via the communication unit 24 (step S14).

After finishing transmitting the necessary start-up instruction, the processor 21 determines whether or not the initialization processing of the main microcomputer 10 has failed by monitoring whether or not a message that is to be transmitted to the ECU 4 by the main microcomputer 10, has been transmitted (step S15). If the initialization processing of the main microcomputer 10 has not failed (S15: NO), i.e. if the sub microcomputer initialization processing of the main microcomputer 10 has been completed, the sub-microcomputer 20 stops processing (step S16), and ends the processing. If the initialization processing of the main microcomputer 10 has failed (S15: YES), the sub-microcomputer 20 transmits a stop instruction to the ECU 4 via the communication unit 24 (step S17), and ends the processing.

In the gateway 2 with the above configuration according to the present modification, the sub-microcomputer 20 that has finished the initialization processing earlier determines whether the initialization processing of the main microcomputer 10 has been successful or failed. If the initialization processing of the main microcomputer 10 has failed, the sub-microcomputer 20 transmits an instruction to stop operation to the ECU 4 to which the sub-microcomputer 20 has transmitted the start-up instruction. Thus, the ECU 4 that has been started up before the initialization processing of the main microcomputer 10 has been completed can be prevented from continuing to operate although the initialization processing of the main microcomputer 10 has failed.

Note that, in the present modification, the sub-microcomputer 20 is configured to determine whether the initialization processing of the main microcomputer 10 has been successful or failed, in accordance with whether or not the main microcomputer 10 has transmitted a message to the ECU 4. However, the present invention is not limited thereto. For example, the main microcomputer may alternatively be configured to directly output a signal for notifying the sub-microcomputer 20 of completion of the initialization processing, and the sub-microcomputer 20 may determine whether or not the initialization processing of the main microcomputer 10 has been successful or failed in accordance with whether or not this notification exists. Alternatively, for example, the main microcomputer 10 and the sub-microcomputer 20 may be configured to directly communicate with each other, the sub-microcomputer 20 may make an inquiry regarding whether or not the initialization processing has been completed to the main microcomputer 10, and the sub-microcomputer 20 may determine whether or not the initialization processing of the main microcomputer 10 has been successful or failed, based on a response to the inquiry.

The embodiments disclosed at this time are examples in all respects, and should be considered to be not restrictive. The scope of the present disclosure is not indicated by the above-described meaning but by the claims, and is intended to encompass all changes made within the meaning and the scope equivalent to the claims.

The invention claimed is:

1. A gateway for use in a vehicle network connecting at least two Electronic Communication Units (ECUs), the at least two ECUs being sequentially started up, the gateway comprising:
    a first processing unit;
    a second processing unit; and
    a communication unit,
    wherein the first processing unit, upon being started up, performs initialization processing thereof,
    the second processing unit requires a shorter time from start-up until completion of the initialization processing than the first processing unit does,
    one of the at least two ECUs is connected to the communication unit via a communication line, and the communication unit communicates with the other one of the at least two ECUs in accordance with control of the first processing unit and the second processing unit, wherein upon completion of an initialization process, the one of the at least two ECUs transmits a start-up instruction to the first and second processing units and the first and second processing units performs initialization processing in parallel with each other, and
    the second processing unit, after completing the initialization processing thereof, transmits an instruction to start up the other one of the at least two ECUs via the communication unit, wherein the first processing unit performs message relay between the one of the at least two ECUs and the other one of the at least two ECUs upon completing the initialization processing.

2. The gateway according to claim 1, wherein the first processing unit and the second processing unit both start the initialization processing if a start-up instruction based on acceptance of an operation is given thereto.

3. The gateway according to claim 1, wherein the second processing unit stops processing after transmitting the instruction to start up the other in-vehicle device.

4. The gateway according to claim 1, wherein if the initialization processing of the first processing unit has failed, the second processing unit transmits an instruction to stop operation to the other in-vehicle device via the communication unit.

5. The gateway according to claim 2, wherein the second processing unit stops processing after transmitting the instruction to start up the other in-vehicle device.

6. The gateway according to claim 2, wherein if the initialization processing of the first processing unit has failed, the second processing unit transmits an instruction to stop operation to the other in-vehicle device via the communication unit.

* * * * *